United States Patent
Weaver et al.

(10) Patent No.: US 6,267,883 B1
(45) Date of Patent: Jul. 31, 2001

(54) WATER CONDITIONER FOR ELIMINATING SCALE

(76) Inventors: Roy J. Weaver; Robert O. Crane, both of P.O. Box 4322, Corpus Christi, TX (US) 78469

(*) Notice: Subject to any disclaimer, the term of this patent is extended or adjusted under 35 U.S.C. 154(b) by 0 days.

(21) Appl. No.: 09/450,283

(22) Filed: Nov. 26, 1999

(51) Int. Cl.⁷ .................................................... C02F 1/46
(52) U.S. Cl. ........................ 210/198.1; 204/248; 204/293; 210/696; 210/748
(58) Field of Search ................................ 44/639; 123/14, 123/538; 204/248, 293; 205/703, 745; 210/696, 192, 198.1, 748

(56) References Cited

U.S. PATENT DOCUMENTS

| | | |
|---|---|---|
| 4,429,665 * | 2/1984 | Brown ........................ 123/3 |
| 4,715,325 | 12/1987 | Walker . |
| 4,789,031 | 12/1988 | Walker . |
| 4,820,422 | 4/1989 | Spencer . |
| 4,959,155 | 9/1990 | Gomez . |
| 5,013,450 | 5/1991 | Gomez . |
| 5,044,347 * | 9/1991 | Ullrich et al. ........................ 123/538 |
| 5,048,499 * | 9/1991 | Daywalt ................ 123/538 |
| 5,059,217 * | 10/1991 | Arroyo et al. .................... 44/639 |
| 5,197,446 | 3/1993 | Daywalt . |
| 5,204,006 | 4/1993 | Santoli . |
| 5,368,705 * | 11/1994 | Cassidy ............................ 204/136 |
| 5,470,462 | 11/1995 | Gauger . |
| 5,814,227 | 9/1998 | Paulis . |

\* cited by examiner

Primary Examiner—Peter A. Hruskoci
(74) Attorney, Agent, or Firm—G Turner Moller

(57) ABSTRACT

A water and fuel conditioning device includes a core or casting made of 40–66% copper, 2–30% zinc, 10–25% nickel, 2–5% tin, 0–1.5% iron and 0–2% lead, all percentages being by weight. Water flowing in contact with this core exhibits greater electrical charge than with prior art devices. The same composition is effective as a fuel conditioner to reduce emissions. In both applications, the near absence of lead has environmental advantages.

6 Claims, 1 Drawing Sheet

WATER CONDITIONER FOR ELIMINATING SCALE

This invention involves a water and fuel conditioning technique using a copper based composition to treat water or fuel flowing through a device for the purpose of minimizing scale formation and reducing emissions.

BACKGROUND OF THE INVENTION

It is known in the art to use a copper based composition to treat water to minimize or eliminate scale formation and to treat fuel for one of several advantages. A different mechanism must be operating because some compositions which are effective for fuel treatment are not effective for water treatment, and vice versa.

Copper based compositions in the form of a casting are known to create catalytic changes in water and fuel flowing in contact with the casting. Disclosures of such compositions are found in U.S. Pat. Nos. 4,715,325; 4,789,031; 4,820,422; 4,959,155; 5,013,450; 5,197,446; 5,204,006; 5,470,462; and 5,814,227.

SUMMARY OF THE INVENTION

In this invention, a composition having 40–60% copper, 2–30% zinc, 10–25% nickel, 2–5% tin, all percentages being by weight, and trace amounts, if any, of iron and lead, produce exaggerated electrical changes in water passing around the composition. Water flowing around a mass of the composition of this invention produces a higher voltage response than water flowing around a mass of known similar water treating compositions which are conceded to be effective in reducing scale and providing other advantages.

Most of the literature fails to explain why the prior art compositions are effective and, at first exposure, one is skeptical they actually work. As will be shown hereinafter, objective tests show that water flowing in contact with appropriate metal compounds have different electrical properties, depending on the composition of the metal compounds. While not being bound by any theory of operation, it appears the increased electrical charges in water flowing through this invention minimizes the deposition of scale precursors in piping. It appears that typical scale, largely calcium carbonate, does not deposit well on the interior of piping until a precursor, mainly phosphates, is deposited. After the precursor deposits on the interior of piping, calcium carbonate based scale readily deposits. Potable water supplied by municipalities is normally electron deficient and not in optimum states of equilibrium. Colloids in the water are also electron deficient and are drawn, by electrostatic attraction, to metals in the plumbing system and accumulate as scale.

The device of this invention provides a source of electrons. When water is run through a device of this invention, electrons are provided to reduce or eliminate the electron deficiency. The bonds holding scale to the walls of plumbing components weakens and allows the scale to break up by adding electrons in a catalytic manner. Water treated by this invention thus prevents new scale deposits, tends to remove old scale deposits from plumbing components and provides other advantages.

The same composition is also effective as a fuel conditioner as will be shown hereinafter by tests. In addition to improved effectiveness, a major advantage is the reduction of lead in the composition thereby minimizing or eliminating releasing lead into the fuel and thereby into the environment.

It is an object of this invention to provide an improved water conditioning device comprising copper, zinc, nickel and tin and having only trace amounts, if any, of lead.

A further object of this invention is to provide a method of conditioning water by passing the water in contact with a metal mass comprising copper, zinc, nickel and tin, and having only trace amounts, if any, of lead.

Another object of this invention is to provide an improved fuel conditioning device comprising copper, zinc, nickel and tin and having only trace amounts, if any, of lead.

These and other objects and advantages of this invention will become more apparent as this description proceeds, reference being made to the accompanying drawings and appended claims.

DETAILED DESCRIPTION

Figure 1:
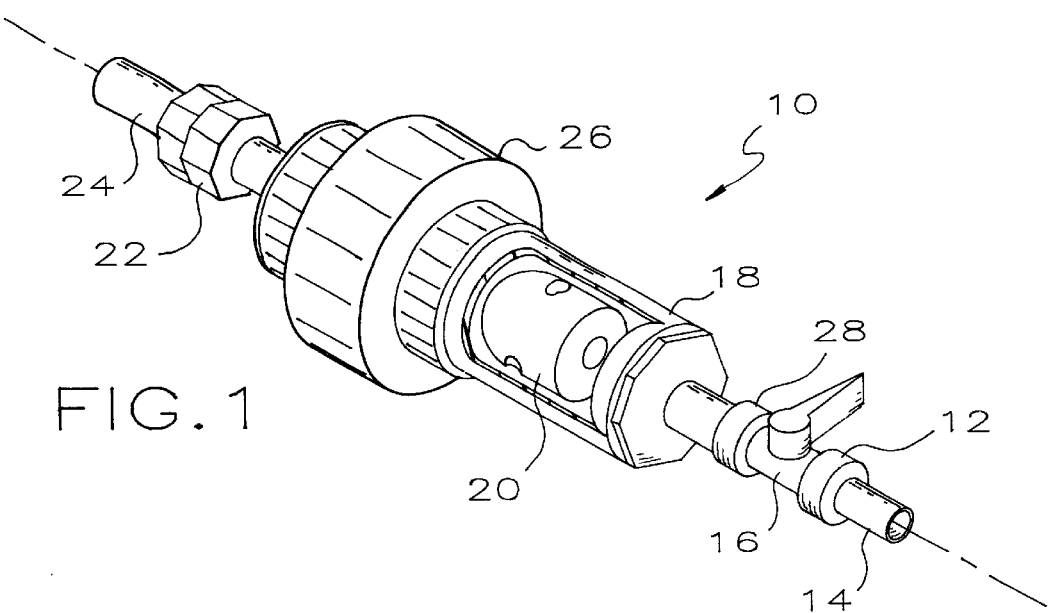
FIG. 1 is a isometric view, partly in section, of a water conditioning installation of this invention.
Figure 2:
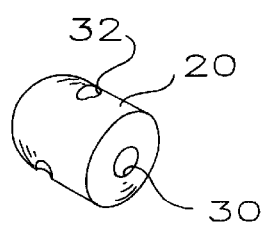
FIG. 2 is a pictorial view of a core of this invention.
Figure 3:
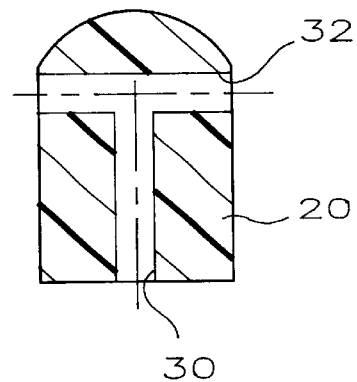
FIG. 3 is a cross-sectional view of the core of FIG. 2.

Referring to FIGS. 1–3, a water conditioning installation 10 comprises an inlet fitting 12 connected to a water supply line 14, a valve 16, a chamber 18 receiving a core or casting 20 of the composition of this invention, and an outlet fitting 22 connected to a water outlet line 24. The inlet fitting 12 accordingly provides an inlet port to the chamber 18 and the outlet fitting 22 provides an outlet port from the chamber 18.

The chamber 18 is preferably equipped with an upper union 26 connecting to the outlet fitting 22. A lower union 28 connects the lower end of the chamber 18 to the valve 16. This allows the chamber 18 to be opened so the casting 20 may be inspected and cleaned if necessary.

The core or casting 20 has an outer surface that is exposed to water passing through the chamber 18. Preferably, the casting 20 promotes turbulent flow in the chamber 18 in any suitable manner. Conveniently, the casting 20 includes a central passage 30 having a series of lateral openings 32 connecting the central passage 26 to the periphery of the casting 20.

It is only the surface of the casting 20 which contacts and thus treats water passing through the chamber 18. Accordingly, the surface of the casting 20 is made of the following composition:

|        | Percentage | preferred percentage | typical device |
|--------|------------|----------------------|----------------|
| copper | 40–66%     | 58–62%               | 60.01%         |
| zinc   | 2–30%      | 20–25%               | 22.57%         |
| nickel | 10–25%     | 12–16%               | 15.03%         |
| tin    | 2–5%       | 2–3.5%               | 2.30%          |
| iron   | 0–1.5%     | .005–1%              | .05%           |
| lead   | 0–2%       | .005–5%              | <.01%          |

All percentages are by weight. Compositions of this invention have a substantially greater objective effect on water flowing through the device than similar prior art compositions. A typical test is shown in Table I where city tap water was passed through three separate devices. The first device was substantially only copper. The second device was a commercially available product having a composition of about 85% copper, 5–6% zinc, 4–5% nickel and 2–3% tin, balance impurities, all percentages being by weight. The third device was a composition of this invention, very similar to the "typical devices" above. The probe of a dc voltmeter was placed in the outlet stream of the water and the values read off the dial.

TABLE I

| copper only | 15–30 millivolts |
|---|---|
| commercial device | 60–90 millivolts |
| this invention | 150–300 millivolts |

There are obviously many unknown factors which affect the electrical charge on water flowing through devices of this type as evidenced by the following: (1) the measured voltages are sometimes negative relative to ground and sometimes positive relative to ground and (2) the values measured by the voltmeter vary substantially from one instant to the next. In all cases, however, the measured voltage in water passing in contact with this invention is higher than through prior art devices and the values in Table I are averages.

Although all of the effects of this higher voltage in output water is not completely clear, it is clear that something substantial occurs when water passes through the device of this invention. The most dramatic evidence is seen from the following tests. Water from Austin, Tex. was collected before and after passing through a device of this invention. The water was placed in a thin film on slides, magnified by 200× and then photographed. The before photographs show large calcite crystals. The after photographs show much smaller aragonite flakes. Experience suggests that larger calcite crystals tend to stick together while aragonite flakes do not.

Another substantial advantage of the composition of this invention is a substantial reduction in the amount of lead. Lead is known to be a heavy metal poison having substantial effects on growing children. Serious effects have been made to reduce lead in the environment. The composition of this invention produces higher measurable effects in treated water and does so with only trace amounts of lead.

Figure 4:
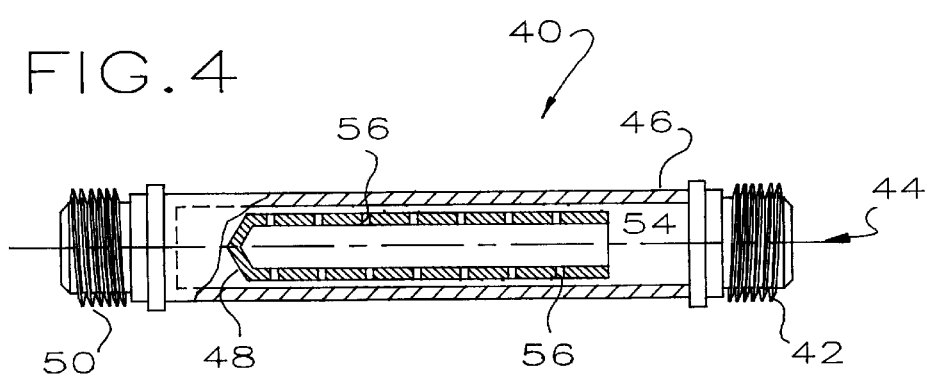
FIG. 4 is a partial cross-sectional view of a fuel conditioning installation of this invention.

The composition of this invention is also effective in treating hydrocarbon fuels. A typical installation is shown in FIG. 4 where the fuel treatment device 40 includes an inlet fitting 42 providing a flow path 44 through the device 40. The fitting 42 is connected to a fuel supply line (not shown), a chamber 46 receiving a core or casting 48 of the composition of this invention, and an outlet fitting 50 connected to a fuel outlet line (not shown). The inlet fitting 42 accordingly provides an inlet port to the chamber 46 and the outlet fitting 50 provides an outlet port from the chamber 46.

The core or casting 48 has an outer surface that is exposed to water passing through the chamber 46. Preferably, the casting 48 promotes turbulent flow in the chamber 46 in any suitable manner. Conveniently, the casting 48 includes a central passage 54 having a series of lateral openings 56 connecting the central passage 54 to the periphery of the casting 48.

It is only the surface of the casting 48 which contacts and thus treats water passing through the chamber 18. Accordingly, the surface of the casting 48 is made of the following composition:

| | Percentage | preferred percentage | typical device |
|---|---|---|---|
| copper | 40–66% | 58–62% | 60.01% |
| zinc | 2–30% | 21–26% | 22.57% |
| nickel | 10–25% | 15–17% | 15.03% |
| tin | 2–5% | 2–3% | 2.30% |
| iron | 0–1.5% | .05–.5% | .05% |
| lead | 0–2% | .01–.5% | <.01% |

All percentages being by weight.

The composition of this invention is effective to condition hydrocarbon fuels used in internal combustion engines. This is shown by conventional analysis of exhaust gases of which the values in Table II are exemplary. The before results were obtained by placing a sampling probe in the exhaust pipe from an engine before the installation of a device of this invention for a total sampling period of 240 seconds. The after results were obtained by placing a sampling probe in the exhaust pipe of the same engine after installation of a device of this invention for a total sampling period of 240 seconds. Cases 1 and 2 involved vehicles. Case 3 was a stationary turbocharged natural gas fueled compressor engine without adjustment of the engine. Case 4 was the engine of case 3 after manually adjusting the engine.

TABLE II

| | Hydrocarbons grams/mile | Carbon Monoxide grams/mile | |
|---|---|---|---|
| Case 1 before | 2.03 | 13.10 | |
| Case 1 after | 1.12 | 7.00 | |
| Case 2 before | 1.47 | 13.20 | |
| Case 2 after | .60 | 5.70 | |
| | NOX ppm | Carbon Monoxide ppm | Oxygen ppm |
| Case 3 before | 3500 | 1800 | .20% |
| Case 3 after | 600 | 1000 | 6.70% |
| Case 4 before | 1900 | 5000 | .20% |
| Case 4 after | 1250 | 1050 | 3.80% |

Cases 3 and 4 are on different natural gas fueled Caterpillar G-399TA engines which are turbocharged and aftercooled. The before value was taken as the engine was running before the installation of a device of this invention. The after value was taken after installation of the device of this invention and adjustment of the engine.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

What is claimed is:

1. A water conditioner for eliminating scale formation, comprising
   a housing having an inlet, an outlet, and a chamber, having a wall, providing fluid communication between the inlet and outlet; and
   a core having a surface, the core being received within the chamber, the chamber wall and core surface providing a flow path between the inlet and outlet, the core surface consisting essentially of 40–60% copper, 2–30% zinc, 10–25% nickel, 1–5% tin, 0–1.5% iron and 0–1% lead, all percentages by weight, the core surface having the property of increasing the voltage of water flowing over the surface, wherein the voltage is increased to values in the range of 150–300 millivolts, to eliminate scale formation in said water.

2. The water conditioner of claim 1 wherein lead is 0.005–0.5%.

3. The water conditioner of claim 1 wherein lead is less than 0.01%.

4. The water conditioner of claim 3 wherein iron is 0.005–1%.

5. The water conditioner of claim 1 wherein lead is zero.

6. The water conditioner of claim 1 wherein copper is 58–62%, zinc is 20–25%, nickel is 12–16%, tin is 2–3.5%, iron is 0.005–1% and lead is 0.005–0.5%.

* * * * *